March 25, 1958     A. J. LECLERC     2,827,722
MOLDED PLASTIC ONE-PIECE PROTECTIVE FRAME FOR LICENSE PLATES
Filed May 17, 1957
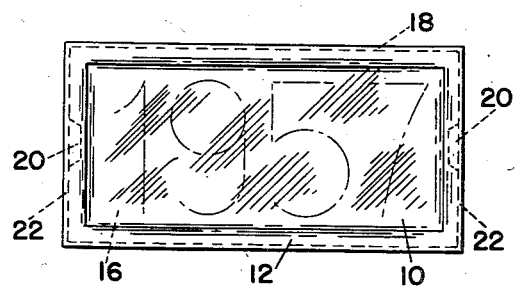
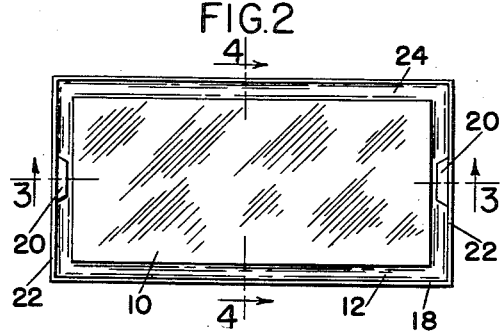
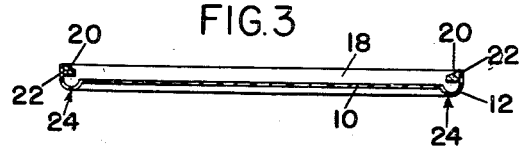
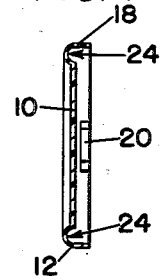
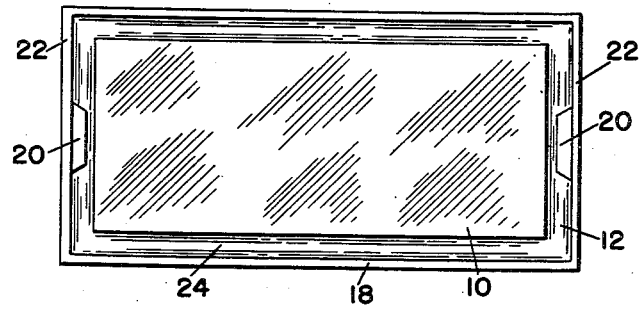
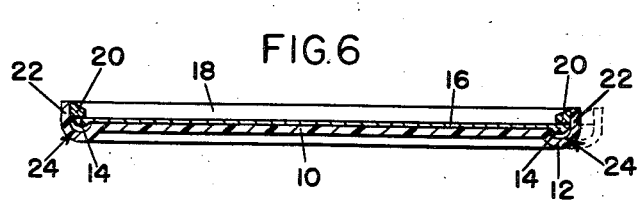
INVENTOR.
ARMAND J. LECLERC
BY *Charles R. Fay,*
ATTORNEY

United States Patent Office 2,827,722
Patented Mar. 25, 1958

2,827,722

MOLDED PLASTIC ONE-PIECE PROTECTIVE FRAME FOR LICENSE PLATES

Armand J. Leclerc, Leominster, Mass.

Application May 17, 1957, Serial No. 659,916

1 Claim. (Cl. 40—125)

This invention relates to a new and improved plastic molded frame for vehicle license plates, and the principal object of the invention resides in the provision of an inexpensive, clear plastic frame having a construction embodying an ornamental safety protective rim therefor, together with means for resiliently snapping the frame directly onto the license plate, so that the license plate in effect supports and mounts the frame and the frame protects the license plate and maintains it clear and clean while at the same time protecting an operator from injury as a result of collision or impingement on the edges of the license plate as in washing the car, etc.

Other objects and advantages include the provision of a clear, transparent one-piece molded frame for license plates comprising a rectangular clear transparent window-like member adapted to be mounted on the license plate and revealing the same therethrough, said frame embodying an integral concavo-convex rim having a flange thereon to protect the edges of the license plate and embodying a pair of end lugs, said flange being distortable and resilient so that the lugs may be disposed on the license plate at the rear surface thereof, thus resiliently holding the frame in position with the numbers of the license plate appearing through the clear space, said concavo-convex rim being painted or otherwise ornamentally processed at the interior side thereof only, so that the paint, etc. is protected against the elements.

Other objects and advantages of the invention will appear hereinafter.

Reference is to be had to the accompanying drawings, in which

Fig. 1 is a view in elevation illustrating the frame in place on the license plate;

Fig. 2 is a view in rear elevation of the frame only;

Figs. 3 and 4 are sectional views on the respective lines in Fig. 2;

Fig. 5 is an enlarged view in rear elevation illustrating the construction of the frame; and Fig. 6 is an enlarged sectional view illustrating the manner in which the license plate is held to the frame.

In carrying out the present invention, the license plate frame comprises principally a rectangular clear transparent section 10 which is very thin in the nature of $\frac{1}{64}$ of an inch or less and integrally molded simultaneously therewith is an ornamental surrounding frame 12 that covers the edges of the license plate and protects the same as well as providing means for attaching the frame to the plate.

This construction is best shown in Figs. 3, 4 and 6 wherein it will be seen that the rim portion 12 is made concavoconvex and extends forwardly to a slight extent with relation to the clear transparent portion 10 for the purpose of accommodating the usual edge portions as at 14 in Fig. 6 of the usual license plate 16.

Extending to the rear from this forwardly-extending concavo-convex rim, there is a flange 18 which is also integral and simultaneously molded with the frame. This frame may extend directly to the rear and is of a size to just accommodate the license plate at the edges thereof.

A pair of lugs 20 are cemented to the end portions 22 of the flange 18 and these lugs are seen to extend toward the interior of the device in a position to overlie the edges of the license plate as clearly shown in Fig. 6, there being such a lug at each end of the frame.

The concavo-convex portion of the rim is painted at the interior thereof as shown in Fig. 5 at 24, and this provides an ornamental as well as protective rim for the frame. It is preferred that the paint used shall render the transparent plastic opaque in this area so that the rough edges of the license plate are completely concealed.

In order to attach the frame to a license plate, it is merely necessary to slide the frame on the license plate at one end thereof and then distort the opposite flanged portion 22 by bending it outwardly as shown in dotted lines in Fig. 6, to a position where the opposite end of the license plate may be placed to underlie the plastic lug. The plastic frame merely snaps onto the plate, and the frame is snugly held thereto and is always maintained in position by the resilience of the device. Of course the flange 18 prevents shifting of the frame on the license plate.

Having thus described my invention and the advantages thereof, I do not wish to be limited to the details herein disclosed, otherwise than as set forth in the claim, but what I claim is:

A one-piece plastic frame for a vehicle license plate comprising a transparent rectangular window member, an integral continuous rim on the member, an integral continuous resilient flange on the rim to overlie and protect the edges of a license plate, said flange extending rearwardly beyond the rear face of the window member, a lug at each end of the member, each lug being mounted on end portions of the flange for engaging the rear surface of the license plate to resiliently urge said license plate against the frame.

References Cited in the file of this patent

UNITED STATES PATENTS

| | | |
|---|---|---|
| 737,124 | Manor | Aug. 25, 1903 |
| 2,093,620 | Roessler | Sept. 21, 1937 |
| 2,167,838 | Hand | Aug. 1, 1939 |
| 2,190,571 | Salducco | Feb. 13, 1940 |
| 2,797,513 | Edwards | July 2, 1957 |